: US007296303B1

United States Patent
Samet (10) Patent No.: US 7,296,303 B1
(45) Date of Patent: Nov. 20, 2007

(54) GARMENT WITH PET CARRYING POUCH

(76) Inventor: Donna Samet, 4809 Avenue N, Suite 127, Brooklyn, NY (US) 11234

( * ) Notice: Subject to any disclaimer, the term of this patent is extended or adjusted under 35 U.S.C. 154(b) by 119 days.

(21) Appl. No.: 11/113,924

(22) Filed: Apr. 25, 2005

(51) Int. Cl.
 A41B 1/00 (2006.01)
 A41D 27/20 (2006.01)
 A01K 1/00 (2006.01)
(52) U.S. Cl. .............................. 2/115; 2/247; 119/496; 119/497
(58) Field of Classification Search ............. 2/93, 2/94, 115, 247–253; 224/158, 159, 646; 119/496, 497
See application file for complete search history.

(56) References Cited

U.S. PATENT DOCUMENTS

| | | | | |
|---|---|---|---|---|
| 1,551,306 A | * | 8/1925 | Hirsch et al. .................... | 2/115 |
| 2,079,220 A | * | 5/1937 | Mahoney .......................... | 2/94 |
| 2,240,902 A | * | 5/1941 | Fishman ......................... | 2/115 |
| 2,448,416 A | * | 8/1948 | Carter .............................. | 2/94 |
| 3,101,482 A | * | 8/1963 | Rahjes ........................... | 2/247 |
| 3,334,357 A | * | 8/1967 | Stults ............................. | 2/247 |
| 3,481,517 A | * | 12/1969 | Aukerman .................. | 224/160 |
| 4,071,236 A | * | 1/1978 | Oprean ........................ | 482/55 |
| 4,079,467 A | * | 3/1978 | Baldwin ......................... | 2/94 |
| 4,402,440 A | * | 9/1983 | Purtzer et al. .............. | 224/160 |
| D275,812 S | * | 10/1984 | Deacon ........................ | D2/864 |
| 4,475,251 A | * | 10/1984 | Hopkins ......................... | 2/94 |
| 4,497,071 A | * | 2/1985 | Bell ................................. | 2/94 |
| 4,579,264 A | | 4/1986 | Napolitano | |
| 4,757,925 A | * | 7/1988 | Knittel ........................ | 224/158 |
| 4,796,304 A | * | 1/1989 | Shelby ............................. | 2/94 |
| 4,834,688 A | | 5/1989 | Jones | |
| D302,354 S | * | 7/1989 | Harper et al. ................ | D3/226 |
| 4,903,873 A | * | 2/1990 | Poole et al. ................ | 224/160 |
| 5,031,244 A | * | 7/1991 | Inagaki ........................... | 2/102 |
| D334,253 S | * | 3/1993 | Balzarini .................... | D30/144 |
| D355,752 S | * | 2/1995 | Abbott ........................ | D2/857 |
| 5,454,119 A | * | 10/1995 | Thomm ......................... | 2/114 |
| D370,090 S | * | 5/1996 | Coggins .................... | D30/109 |
| 5,588,154 A | * | 12/1996 | Blauer et al. ................... | 2/69 |
| 5,611,083 A | | 3/1997 | Arnold | |
| 5,678,739 A | | 10/1997 | Darling et al. | |
| D387,510 S | * | 12/1997 | Way .......................... | D30/144 |
| 5,901,666 A | * | 5/1999 | Belisle ....................... | 119/497 |
| 5,946,725 A | * | 9/1999 | Shatzkin et al. ............... | 2/106 |

(Continued)

FOREIGN PATENT DOCUMENTS

CA  2.167.417  12/1997

(Continued)

OTHER PUBLICATIONS

PuppyPouches, www.puppypouches.com [retrieved initially from internet Mar. 17, 2006], 5 pages.*

Primary Examiner—Alissa Hoey
Assistant Examiner—Jena A Sold
(74) Attorney, Agent, or Firm—Michael I Kroll (57) ABSTRACT

An apparatus worn by a user for carrying a pet comprising a garment worn on a torso of the user having a pouch having a first open end attached on a first side of the garment wherein the pet is received through the open end and retained within the pouch.

2 Claims, 9 Drawing Sheets

U.S. PATENT DOCUMENTS

| | | | |
|---|---|---|---|
| 6,105,170 A * | 8/2000 | Lisciandro et al. | 2/102 |
| 6,135,333 A * | 10/2000 | Tucker et al. | 224/646 |
| 6,209,134 B1 * | 4/2001 | Schiesel | 2/102 |
| 6,481,606 B2 * | 11/2002 | Pickett | 224/637 |
| 6,536,047 B1 * | 3/2003 | Mullaly | 2/48 |
| 6,595,396 B2 | 7/2003 | Cummings et al. | |
| 6,701,871 B1 | 3/2004 | Johnson | |
| 6,772,925 B2 * | 8/2004 | O'Hare | 224/155 |
| 6,802,282 B2 * | 10/2004 | Muckleroy | 119/497 |
| 7,117,824 B2 * | 10/2006 | Holtzworth et al. | 119/850 |
| 2002/0124808 A1 * | 9/2002 | Zampelli et al. | 119/497 |
| 2002/0157170 A1 * | 10/2002 | Lipscher | 2/250 |
| 2002/0189000 A1 * | 12/2002 | Jordan | 2/102 |
| 2003/0182714 A1 * | 10/2003 | Mariland et al. | 2/247 |
| 2006/0005294 A1 * | 1/2006 | Fugazzi | 2/115 |
| 2006/0049227 A1 * | 3/2006 | Godshaw et al. | 224/637 |

FOREIGN PATENT DOCUMENTS

| | | |
|---|---|---|
| EP | 0.087.063 | 8/1983 |
| EP | 0164309 A2 * | 12/1985 |
| GB | 540.672 | 10/1941 |
| WO | WO99/01045 | 1/1999 |

* cited by examiner

GARMENT WITH PET CARRYING POUCH

BACKGROUND OF THE INVENTION

1. Field of the Invention

The present invention relates generally to clothing and, more specifically, to a garment incorporating means for carrying a pet therein. The garment is preferably worn on a user's torso and includes pockets for storage. The garment has an accessible pouch positioned either on its interior or exterior for receiving a pet therein. Additionally the pouch may include padding situated therein providing footing and comfort for the pet. The supple pouch material can be manufactured from the same material as the garment or other materials, such as cotton fleece, sherpa, micro fleece, french terri, berber fabric etc, of varying colors, patterns and images.

2. Description of the Prior Art

There are other garments incorporating pouches. Typical of these is U.S. Pat. No. 4,579,264 issued to Napolitano on Apr. 1, 1986.

Another patent was issued to Jones on May 30, 1989 as U.S. Pat. No. 4,834,688. Yet another U.S. Pat. No. 5,611,083 was issued to Arnold on Mar. 18, 1997 and still yet another was issued on Oct. 21, 1997 to Darling et al. as U.S. Pat. No. 5,678,739.

Another patent was issued to Shatzkin et al. on Sep. 7, 1999 as U.S. Pat. No. 5,949,725. Yet another U.S. Pat. No. 6,481,606 was issued to Pickett on Nov. 19, 2002. Another was issued to Cummings et al. on Jul. 22, 2003 as U.S. Pat. No. 6,595,396 and still yet another was issued on Mar. 9, 2004 to Johnson as U.S. Pat. No. 6,701,871.

Another patent was issued to Sims on Oct. 24, 1941 as U.K. Patent No. GB540,672. Yet another European Patent Application No. EP 0 087 063 was published on Aug. 31, 1983 to Moore. Another was issued to Porter on Dec. 12, 1997 as Canadian Patent No. CA2,167,417 and still yet another was Published on Jan. 14, 1999 to Garneau as International Patent Application No. WO99/01045.

U.S. Pat. No. 4,579,264

Inventor: Nadine A. Napolitano

Issued: Apr. 1, 1986

A fabric baby carrier is secured to an adult by simple tie straps. The carrier includes an outer pouch and an inner pouch formed on the inner surface of front panel of the outer pouch. The upper edges of both inner and outer pouches are elasticized to permit the baby a degree of freedom of movement without sacrificing secure support. Furthermore, the inner pouch is flared in the rear adjacent the crotch to prevent the legs from swinging excessively and thereby injuring the child.

U.S. Pat. No. 4,834,688

Inventor: Leonard W. Jones

Issued: May 30, 1989

A surface of an article of clothing is provided with a transparent pouch for holding a liquid representative of a beverage. The article has indicia thereon whereby the indicia is visible through the pouch.

U.S. Pat. No. 5,611,083

Inventor: Barbara A. Arnold

Issued: Mar. 18, 1997

A robe-like garment for use in changing clothes is large and loose-fitting on the wearer, with a hood, a large neck opening and a pair of short enlarged-diameter sleeves. In the front of the changing robe is a large central pocket which is accessible by zipper from the outside front of the garment and is also accessible from the inside of the garment. The changing robe is sufficiently roomy to permit the user to disrobe and change clothes inside the robe, retrieving clothing to be worn from the interior access of the large pocket, and placing the changed clothing in the same pocket. The sleeves of the robe are short enough and have large enough openings to permit convenient withdrawal of the user's arms to the interior of the robe. In a preferred embodiment the garment is formed of a liquid-absorbent terry cloth. The changing robe is useful in situations such a public beaches, for changing into and out of swimming gear. A slightly modified form is provided for wheelchair-bound persons, enabling the robe to be slipped down over the head and torso without leaving the sitting position.

U.S. Pat. No. 5,678,739

Inventor: Sandra M. Darling et al.

Issued: Oct. 21, 1997

A front infant carrier which includes a vest-like harness that is worn by the attendant, a detachable infant shell, and a sling. The detachable infant shell attaches to the harness at three attachment points, either in a forward-facing or rearward-facing orientation. In the rearward-facing position, the shell attaches to the harness by a peg/button mounted at the crotch of the shell which snaps into a socket centrally mounted at the lower front of the harness, and by a pair of upper clips on the shell which engage rings on the upper front of the harness. The forward-facing attachment uses a second peg/button at the lower back portion of the shell, instead of the crotch peg/button, and attaches in a similar fashion, whereby the second peg/button snaps into the socket centrally mounted at the lower front of the harness, and the pair of upper clips on the shell engage the rings on the upper front of the harness. A sling may also be attached to the harness at three points, the sling having a third peg/button which mates with the socket centrally mounted at the lower front of the harness and has a pair of upper clips which engage the rings on the upper front of the harness. The sling may be attached so that the disengaged shell and carried infant may be rested sideways within the sling. The sling is reinforced with sewn-in battens to help provide support for the infant to rest in the sling alternatively without the shell.

U.S. Pat. No. 5,946,725

Inventor: Ellen Shatzkin et al.

Issued: Sep. 7, 1999

An article of clothing such as a shirt or blouse which allows for Kangaroo Care by providing skin to skin contact between a person and infant which includes a pouch or pouches on the inside of the shirt centrally located thereon in which the infant may be placed. A larger pouch for a more developed infant may also be provided.

U.S. Pat. No. 6,481,606

Inventor: Sylvia Pickett

Issued: Nov. 19, 2002

A small animal carrying device incorporating a pouch section with a padded bottom. The pouch is closed by a drawstring and a harness assembly using padded crossover straps secures the device around the carrier's shoulders. An additional strap at the bottom of the pouch secures the device around the carrier's waist or lower torso. It can be worn in the front and back positions and contains a side pocket for carrying a leash or other accessories.

U.S. Pat. No. 6,595,396

Inventor: Quinn L. Cummings et al.

Issued: Jul. 22, 2003

A child or pet carrier characterized by an over-the-shoulder sling of sufficient width and strength to support the weight of an infant, young child, or small pet which connects to an increased width of fabric or joined panels of fabric designed and constructed to form a holding portion that allows the child to rest in a sitting or reclined posture when held against the side, hip, or torso area of a carrying adult and that is further enhanced by an integrated drawstring, adjustable strap, or rubberized compression cord that runs along one transverse side of the holding portion that can be adjusted in such a manner as to create a more stable back and/or side support for the child or pet held therein.

U.S. Pat. No. 6,701,871

Inventor: Joanna L. Johnson

Issued: Mar. 9, 2004

An animal transport system is provided, having a wall defining an interior space and a top opening. At least a portion of the wall is constructed so as to restrict the passage of claws there through. The system also comprises a protective covering and means for releasably securing the cover over the interior space. Carrying means are provided, as are means for allowing the transfer of air into and out of the interior space. Preferably, the system is of a construction which biases an animal provided therein away from a prone position, protects the animal from environmental conditions, and obstructs the animal's view of the exterior, to calm, the animal and reduce any increase in anxiety as the animal is moved from a dangerous area to a safe area.

U.K. Patent Number GB540,672

Inventor: Dorothy Sims

Issued: Oct. 24, 1941

A device for carrying an infant on the person comprising a piece of material the ends of which can be tied to form a sling on the inside of which bands are provided for embracing the infant.

European Patent Application Number EPO 087 063

Inventor: Ann A. Moore

Published: Aug. 31, 1983

A soft pouch-type infant carrier, adapted to be fitted to the body of an adult carrying the infant, has a drawstring system extending transversely of a seat portion of the carrier and operable to preset the maximum distance separating the leg openings.

Canadian Patent Number 2,167,417

Inventor: Doreen Edna Porter

Issued: Dec. 12, 1997

With this invention, a pet owner may carry their small animal in a hands-free manner. The pet tote is a small animal carrying device which is worn over the right shoulder and neck. The pet tote provides a small cushioned solid base platform on which the small animal may sit or lay down with an attached shoulder strap design for safe, hands-free carrying support.

International Patent Application Number WO 99/01045

Inventor: Louis Garneau et al.

Published: Jan. 14, 1999

The sports shirt of the present invention is made of an elastic fabric and has an elongated, flexible integral inner pocket fixedly and permanently installed on the inner surface of the shirt's back side. The elongated pocket is sewn at it's upper and lower extremities to the shirt fabric, and defines an inner chamber which holds an elongated flexible water pouch correctly sized to fit therein.

While these carrying devices may be suitable for the purposes for which they were designed, they would not be as suitable for the purposes of the present invention, as hereinafter described.

SUMMARY OF THE PRESENT INVENTION

The present invention relates generally to clothing and, more specifically, to a garment incorporating means for carrying a pet therein. The garment is preferably worn on a user's torso and includes pockets for storage. The garment has an accessible pouch positioned either on its interior or exterior for receiving a pet therein. Additionally the pouch may include padding situated therein providing footing and comfort for the pet. The supple pouch material can be manufactured from the same material as the garment or other materials, such as cotton fleece, sherpa, micro fleece, french terri, berber fabric etc, of varying colors, patterns and images.

A primary object of the present invention is to provide a pet carrier garment that overcomes the shortcomings of the prior art.

Another object of the present invention is to provide a pet carrier garment having an accessible pouch positioned on at least one of an external surface and an internal surface.

Still another object of the present invention is to provide a pet carrier garment wherein the garment is worn on the torso of a user A further object of the present invention is to provide a pet carrier garment wherein the garment includes but is not limited to a shirt, vest and sweatshirt.

Yet another object of the present invention is to provide a pet carrier garment wherein the pouch forms an integral part of the garment having opposing sides connected to one another at a bottom side thereof.

Another object of the present invention is to provide a pet carrier garment wherein the pouch includes an open top side opposite the bottom side for providing access to the pouch.

Still yet another object of the present invention is to provide a pet carrier garment wherein the pouch includes padding that is appropriately situated therein for providing footing for the pet Yet another object of the present invention is to provide a pet carrier garment wherein the pouch includes padding that is appropriately situated therein for providing comfort for the pet.

Another object of the present invention is to provide a pet carrier garment having a pouch wherein the pouch material is the same material as the garment Still another object of the present invention is to provide a pet carrier garment wherein each of the garment and the pouch are formed from material including but are not limited to cotton fleece, sherpa, micro fleece, french terry and berber fabric, or any combination thereof.

Another object of the present invention is to provide a garment having a pet carrier pouch wherein the pouch material is one of a plurality of colors, patterns and images displayed thereon.

Yet another object of the present invention is to provide a pet carrier garment wherein the hem of the garment can be formed of a thick waistband or drawstring providing means for cinching the hem of the garment to the user.

Still yet another object of the present invention is to provide a pet carrier garment wherein the pouch is pleated thereby providing the pet retained therein with greater space.

Another object of the present invention is to provide a pet carrier garment wherein the pouch includes an expandable base that will deploy when the pet is placed therein.

Still another object of the present invention is to provide a pet carrier garment wherein the pouch can incorporate a mesh-like opening on one side thereof.

Another object of the present invention is to provide a pet carrier garment wherein the mesh-like opening provides the pet with at least one of ventilation and a viewing port.

Yet another object of the present invention is to provide a pet carrier garment wherein the pouch includes an open end able to restrict passage therethrough in part or in total.

Another object of the present invention is to provide a pet carrier garment able to restrict the opening of the garment pouch using one of zippers, snaps, buttons and draw strings.

Still yet another object of the present invention is to provide a pet carrier garment including a fastener that is attachable to the pet's collar for use as a safety feature.

Yet another object of the present invention is to provide a pet carrier garment having a pouch that is simple and easy to use.

Still yet another object of the present invention is to provide a pet carrier garment having a pouch that is inexpensive to manufacture and operate.

Additional objects of the present invention will appear as the description proceeds.

The present invention overcomes the shortcomings of the prior art by providing a garment incorporating means for carrying a pet wherein said garment is preferably a shirt, vest or sweatshirt with sleeves that has an accessible pouch positioned either interiorly or exteriorly. The pouch forms an integral part of the garment having opposing sides and bottom fastened to the garment with the top providing access thereto. Padding can be appropriately situated within the pouch providing footing and comfort for the pet. The supple pouch material can be manufactured from the same material as the garment or other materials, such as cotton fleece, sherpa, micro fleece, french terri, berber fabric etc, of varying colors, patterns and images. At time of manufacture seams can include additional elements acting to reinforce the bonding of the pouch to the garment.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the pet pouch garment of the present invention. With regard to the reference numerals used, the following numbering is used throughout the various drawing figures.

10 pet pouch garment of the present invention
12 user
14 pet
16 pouch
18 pouch top 20 pouch bottom
22 pouch sides
24 zipper
26 mesh viewing window
28 pleat
30 pouch drawstring
32 garment drawstring
33 front side of shirt
34 expandable pouch base
35 backside of the shirt
36 long sleeve shirt
38 clasp attachment
40 pockets
42 pouch liner
44 snap members
46 reinforcement
50 waistband
52 attaching means

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 9 illustrate a pet pouch garment of the present invention which is indicated generally by the reference numeral 10.

Figure 1:
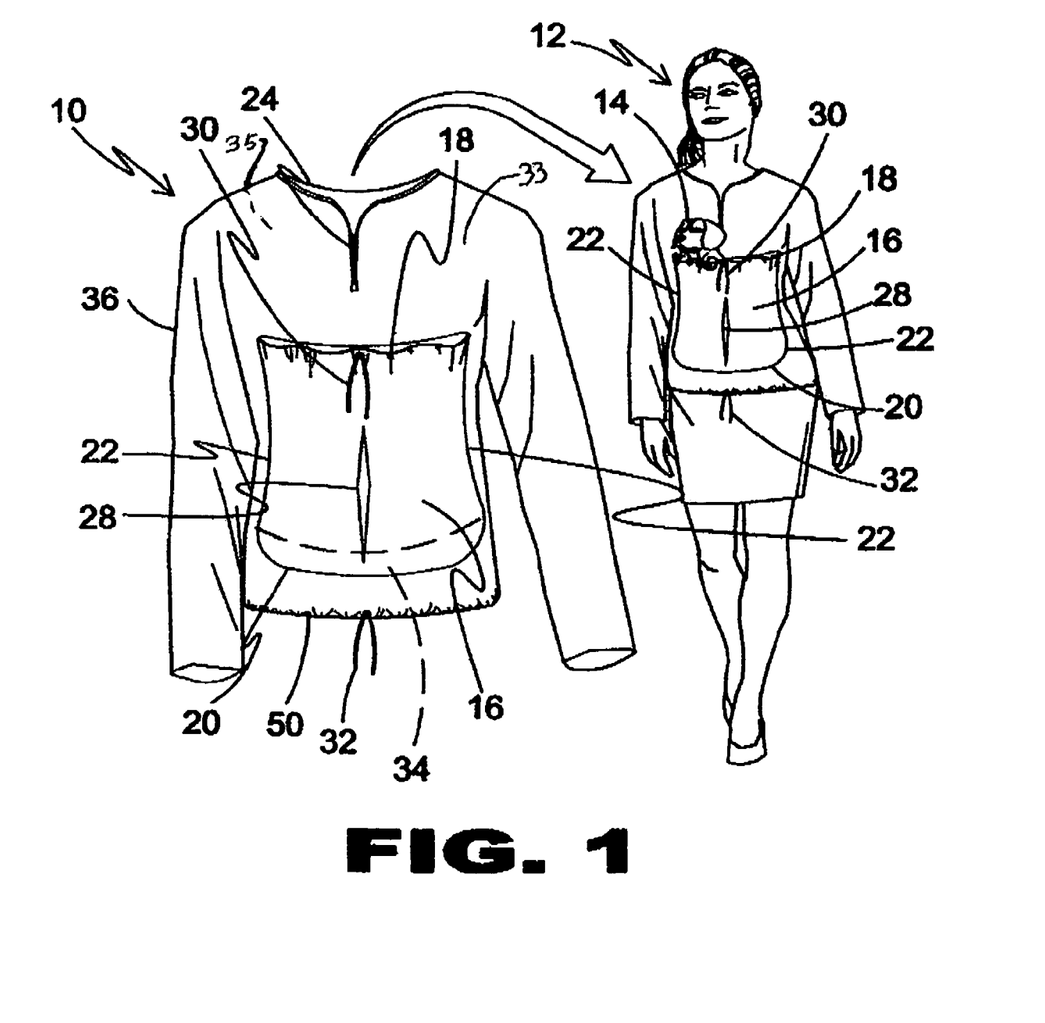
FIG. 1 is a perspective view of the pet pouch garment of the present invention.

The pet pouch garment 10 is in the form of a long sleeve shirt 36. The type of garment includes but is not limited to a long sleeve shirt 36, a short sleeve shirt, a jacket, a sweatshirt, vest, and a sweater. The invention will be described hereinafter as including the shirt 36. However, it should be known that the shirt 36 is merely exemplary and that the garment forming the pet pouch garment 10 of the preset invention may include any garment able to be worn on the torso of a user. The shirt 36 has a front side 33 and a backside 35, not shown. The neckline of the front side 33 of the shirt 36 includes a zipper 24, as shown herein. A pet pouch 16 is attached to the front side 33 of the shirt 36. The pet pouch 16 can be made from the same material as the garment or can be made from a plurality of other materials. The pet pouch 16 has a pouch top 18, a pouch bottom 20 and two opposing pouch sides 22. The pouch 16 is formed by attaching the edges of the opposing side 22 leaving an opening at pouch top 18 as illustrated. The pouch 16 is then attached to the rent at a predetermined location along three edges as illustrated and further connected at the top pouch 18 edge of one of the opposing sides 22. The pouch 16 is secured to the shirt 36 and able to receive and support the weight of a pet 14 therein.

In one embodiment the pouch bottom 20 includes an expandable pouch base 34 to allow more room for the pet 14. The pouch top 18 can be closed to prevent the pet 14 from inadvertently escaping from the pet pouch 16. A plurality of means exist to close the pouch top 18 including but not limited to a pouch drawstring 30, as shown herein, zippers, snaps, buttons, and hook and loop fasteners. The front of the pet pouch 16 includes a centrally located, single vertically extending pleat 28 also for expansion, to better accommodate pets 14 of different sizes. The bottom hem of the shirt 36 can include a waistband 50. The waistband 50 can cinch the hem of the garment to the user. Alternatively, the hem can include a garment drawstring 32, as shown herein. The comfort of the user 12 is increased when the pet 14 is in the pet pouch 16 by cinching the garment to the user 12. Additionally, cinching the garment to the user 12 makes the pet 14 feel more secure.

FIG. 1 also shows the garment 10 being worn by a user 12. Shown herein, the user 12 is wearing the pet pouch garment 10 described hereinabove. Herein, the pet pouch 16 is shown retaining the pet 14. The pouch drawstring 30 is in the open position allowing the pet 14 to peak out of the pouch top 18.

Figure 2:
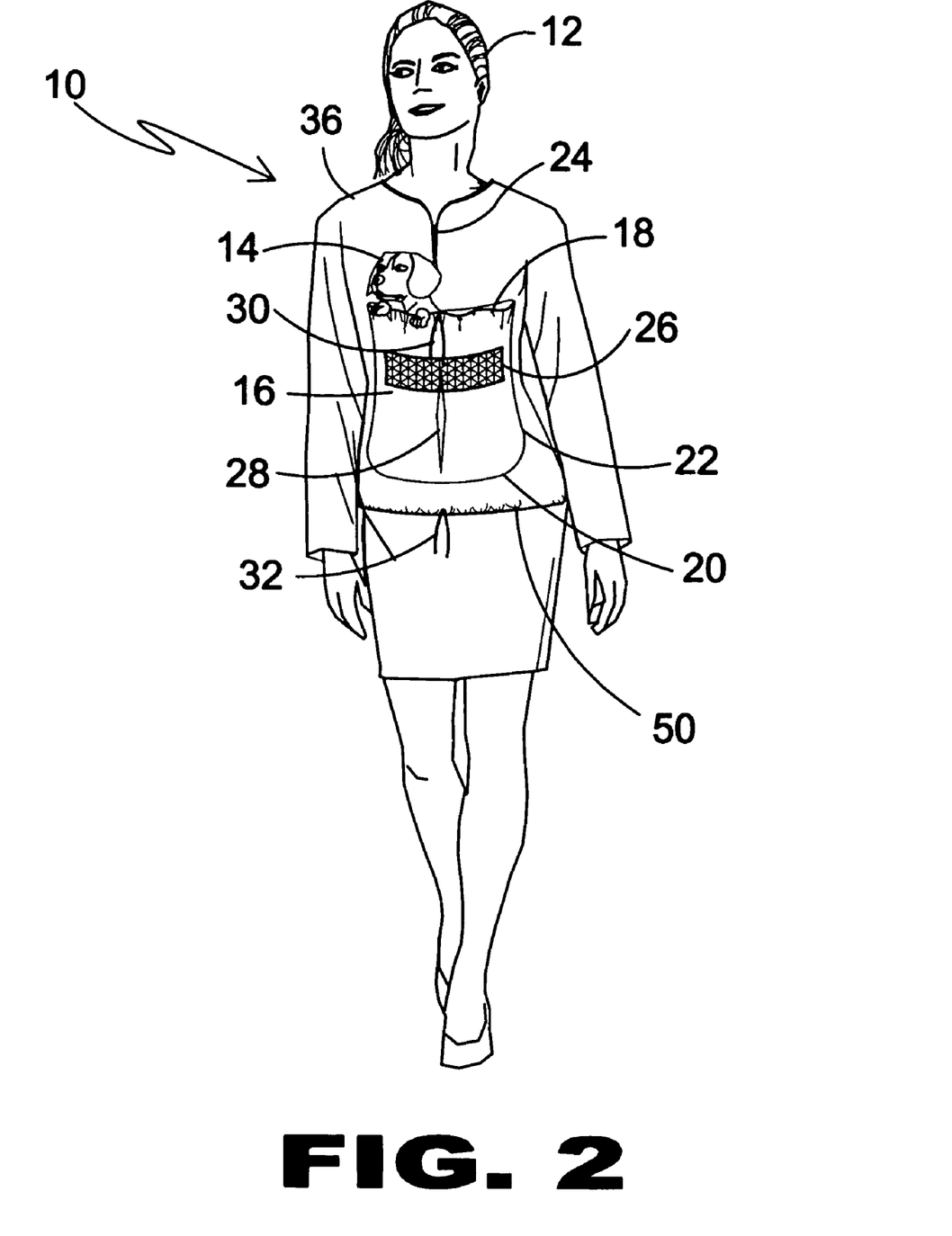
FIG. 2 is an illustrative view of the pet pouch garment of the present invention in use.

FIG. 2 is an illustrative view of an alternate embodiment of the pet pouch garment 10 of the present invention in use. The pet pouch garment 10 includes the shirt 36 and the pet pouch 16 attached to the shirt 36 as described above with reference to FIG. 1. The pet pouch 16 can be made from the same material as the garment or can be made from a plurality of other materials. The shirt 36 includes the front side 33 and the backside 35. The neckline of the front side 33 of the shirt 36 includes the zipper 24. The pouch 16 shown herein includes the pleat 28 on the front thereof to allow the pouch 16 to expand when the pet 14 is located therein, and to lay flat when the pet 14 is not located therein. The embodiment shown herein also includes a mesh viewing window 26 in the front of the pouch 16. The mesh viewing window 26 is located between the top of the pleat 28 and the pouch top 18. However, this placement is for purposes of example only, and the mesh viewing window 26 can be located in a plurality of locations on the pouch 16. The mesh viewing window 26 allows the pet 14 to see outside the pouch 16 when he is enclosed therein. The mesh viewing window 26 also acts as a ventilation means when the pet 14 is enclosed therein. Shown herein, while the pouch top 18 includes the pouch drawstring 30 to close the top of the pouch 16 and retain the pet 14 therein, the drawstring is not cinched and the pet 14 is permitted to peak out of the pouch top 18. Thus, in the figure shown herein, the mesh viewing window 26 is not in use. Alternatively, a plurality of means exist to close the pouch top 18 including but not limited to a pouch drawstring 30, as shown herein, zippers, snaps, buttons, and hook and loop fasteners. The bottom hem of the shirt 36 can include the waistband 50. The waistband 50 can cinch the hem of the garment to the user. Alternatively, the hem can include the garment drawstring 32, as shown herein. The garment drawstring 32 can be used to cinch the hem of the garment to the user. The comfort of the user 12 is increased when the pet 14 is in the pet pouch 16 by cinching the garment to the user 12. Additionally, cinching the garment to the user 12 makes the pet 14 feel more secure.

Figure 3:
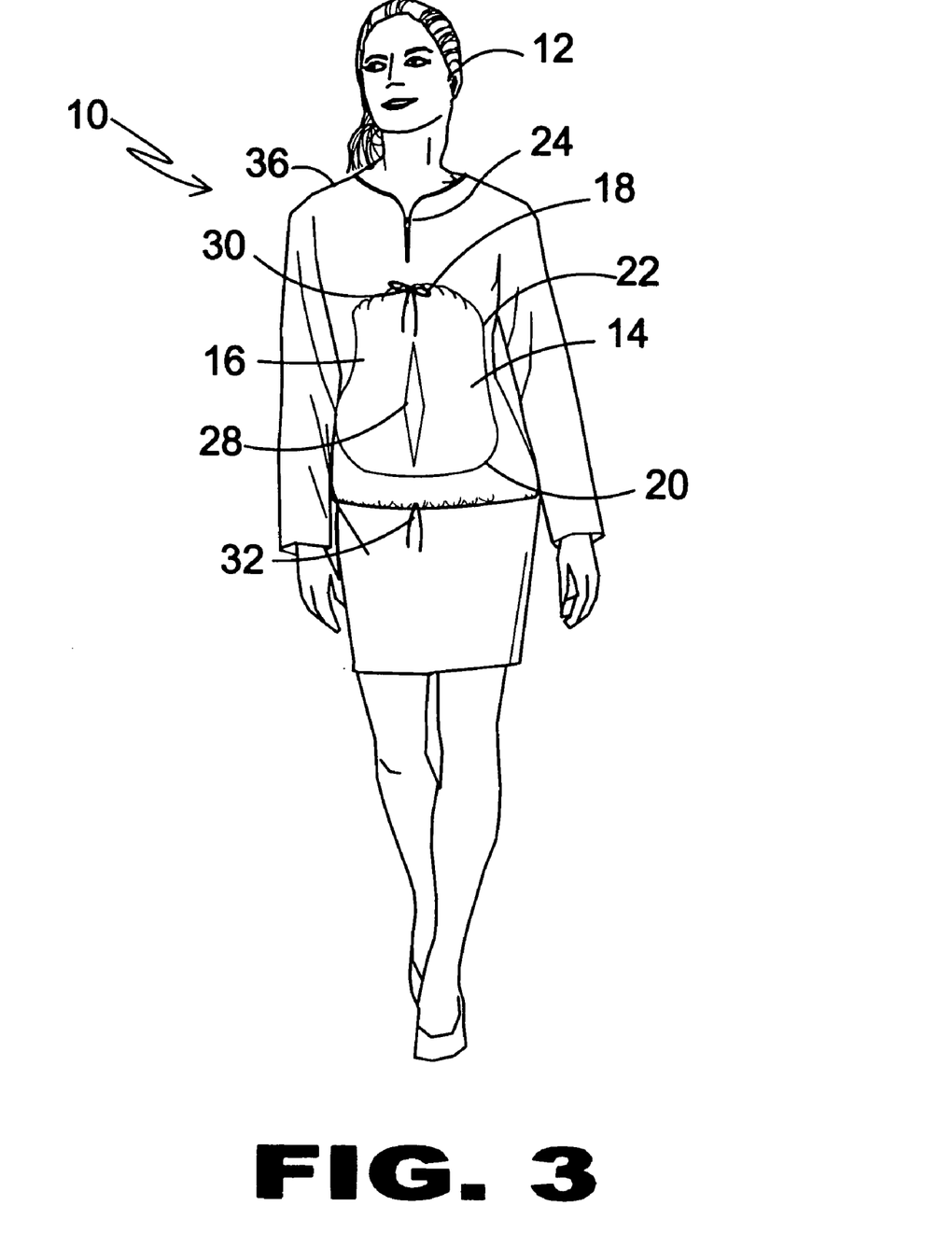
FIG. 3 is an illustrative view of the pet pouch garment of the present invention.

FIG. 3 is an illustrative view of the pet pouch garment 16 of the present invention. The pet pouch garment 10 includes the shirt 36 and the pet pouch 16 attached to the shirt 36 as described above with reference to FIG. 1. The pet pouch 16 can be made from the same material as the garment or can be made from a plurality of other materials. The shirt 36 includes the front side 33 and the backside 35. The neckline of the front side 33 of the shirt 36 includes the zipper 24. The pouch 16 shown herein includes the pleat 28 on the front thereof to allow the pouch 16 to expand when the pet 14 is located therein, and to lay flat when the pet 14 is not located therein.

Shown herein, the pouch drawstring 30 located at the pouch top 18 is cinched to close the top of the pouch 16 and retain the pet 14 therein. This secures the pet 14 within the pouch 16 and prevents him from inadvertently escaping.

Alternatively, a plurality of means exist to close the pouch top 18 including but not limited to zippers, snaps, buttons, and hook and loop fasteners. The pouch 16 shown herein includes the pleat 28 on the front thereof to allow the pouch 16 to expand when the pet 14 is located therein, and to lay flat when the pet 14 is not located therein. The bottom hem of the shirt 36 can include a waistband 50. The waistband 50 can cinch the hem of the garment to the user. Alternatively, the hem can include the garment drawstring 32, as shown herein. The garment drawstring 32 can be used to cinch the hem of the garment to the user. The comfort of the user 12 is increased when the pet 14 is in the pet pouch 16 by cinching the garment to the user 12. Additionally, cinching the garment to the user 12 makes the pet 14 feel more secure.

Figure 4:
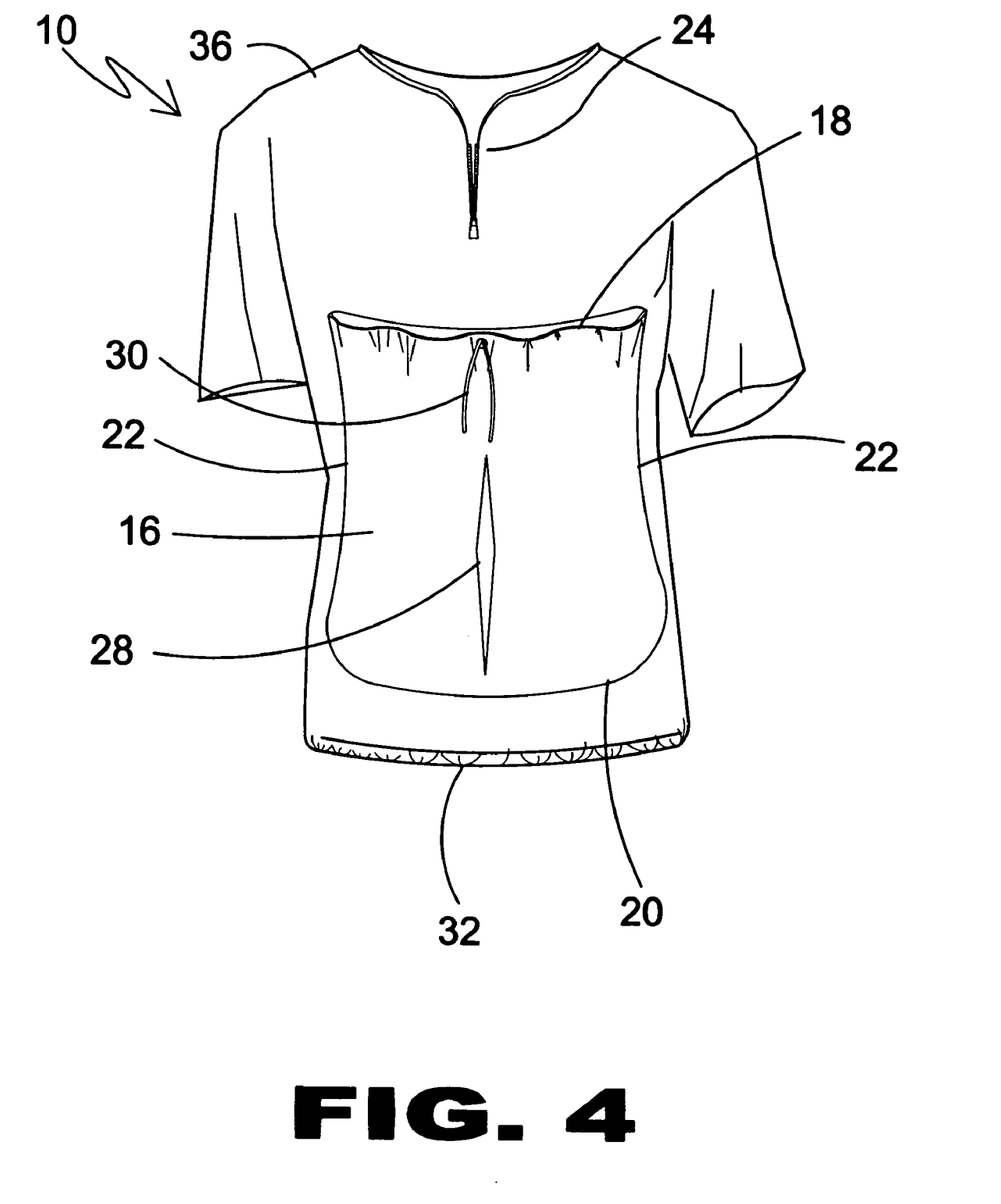
FIG. 4 is a perspective view of the front of the pet pouch garment of the present invention.

FIG. 4 is a perspective view of the front of the pet pouch garment 10 of the present claimed invention in the form of a short sleeve shirt. The pet pouch garment 10 includes the shirt 36 and the pet pouch 16 attached to the shirt 36 as described above with reference to FIG. 1. The shirt includes the front side 33 and the backside 35. The neckline of the front side 33 of the shirt 36 includes the zipper 24. The pet pouch 16 can be made from the same material as the garment or can be made from a plurality of other materials.

In one embodiment the pouch bottom 20 includes an expandable pouch base 34 to allow more room for a pet 14. The pouch top 18 remains unattached to permit a user 12 to insert and remove the pet 14 from said pet pouch 16. The pouch top 18 can be closed to prevent the pet 14 from inadvertently escaping from the pet pouch 16. A plurality of means exist to close the pouch top 18 including but not limited to the pouch drawstring 30, as shown herein, zippers, snaps, buttons, and hook and loop fasteners. Shown herein the pouch drawstring 30 is included as a means to close the pouch top 18. However, the pouch top 18 remains open as the pouch drawstring 30 is not cinched. The pleat 28 is included in the front of the pet pouch 16 for expansion and to better accommodate pets 14 of different sizes. The bottom hem of the shirt 36 can include the waistband 50. The waistband 50 can cinch the hem of the garment to the user. Alternatively, the hem can include the garment drawstring 32, as shown herein. The garment drawstring 32 can be used to cinch the hem of the garment to the user. The comfort of the user 12 is increased when the pet 14 is in the pet pouch 16 by cinching the garment to the user 12. Additionally, cinching the garment to the user 12 makes the pet 14 feel more secure.

Figure 5:
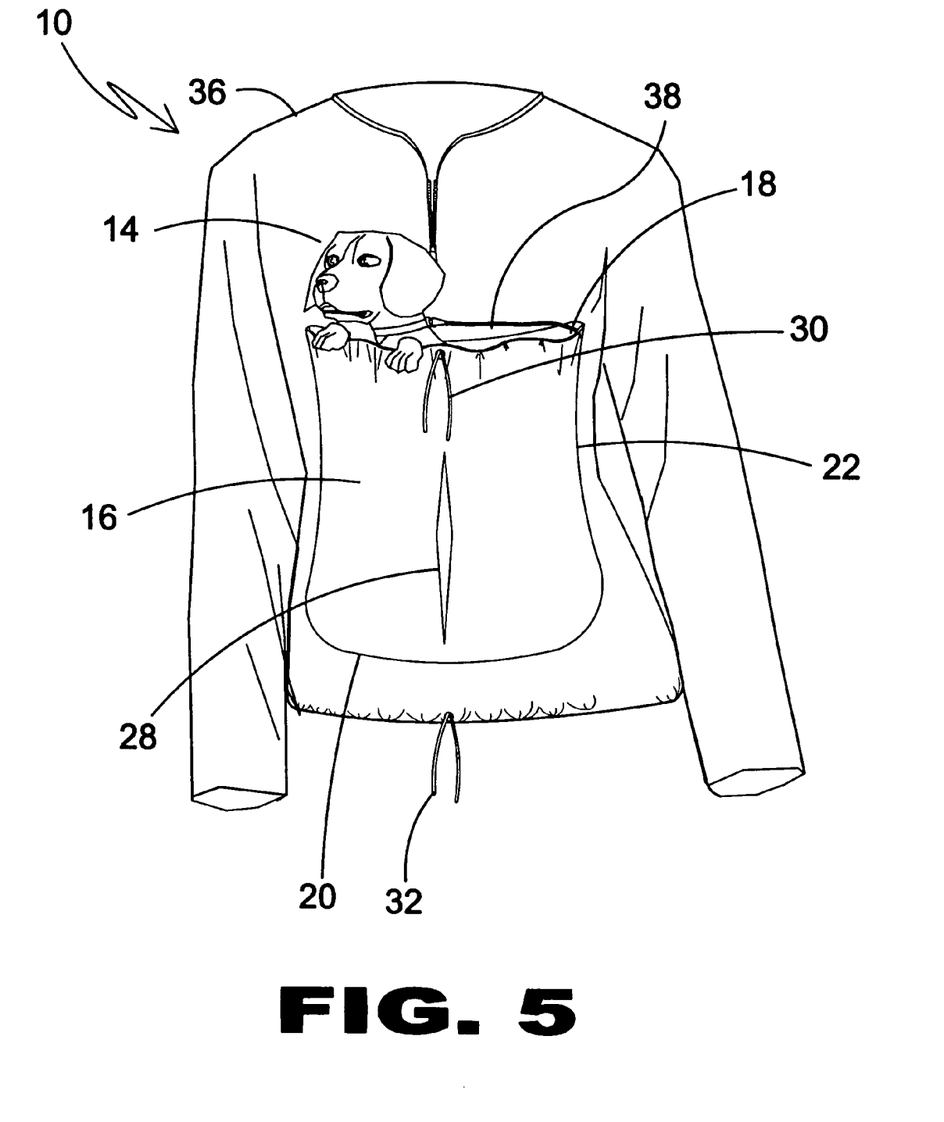
FIG. 5 is an illustrative view of the front of the pet pouch garment of the present invention having a pet therein.

FIG. 5 is an illustrative view of the front of the pet pouch garment 10 of the present invention. The pet pouch garment 10 includes the shirt 36 and the pet pouch 16 attached to the shirt 36 as described above with reference to FIG. 1. The pet pouch 16 can be made from the same material as the garment or can be made from a plurality of other materials. The shirt 36 includes the front side 33 and the backside 35. The neckline of the front side 33 of the long sleeve shirt 36 includes the zipper 24. In one embodiment the pouch bottom 20 includes an expandable pouch base 34 to allow more room for a pet 14. The pouch 16 shown herein includes the pleat 28 on the front thereof to allow the pouch 16 to expand when the pet 14 is located therein, and to lay flat when the pet 14 is not located therein. Shown herein, while the pouch top 18 includes the pouch drawstring 30 to close the top of the pouch 16 and retain the pet 14 therein, the drawstring is not cinched and the pet 14 is permitted to peak out of the pouch top 18. Alternatively, a plurality of means exist to close the pouch top 18 including but not limited to a pouch drawstring 30, as shown herein, zippers, snaps, buttons, and Hook and loop tape. The pouch top 18 also has a clasp attachment 38 located on the rim thereof. The user 12 attaches the pet's collar to the clasp attachment 38 as a safety feature. When the pet's 14 collar is secured in the clasp attachment 38, the pet 14 is unable to jump out of the pet pouch 16. In an alternative embodiment, the clasp attachment 38 could be attached to a shortened leash, which in turn is attached to the pet's 14 collar. In this embodiment, the pet 14 has more room in which to move. The bottom hem of the shirt 36 can include the waistband 50. The waistband 50 can cinch the hem of the garment to the user. Alternatively, the hem can include the garment drawstring 32, as shown herein. The garment drawstring 32 can be used to cinch the hem of the garment to the user. The comfort of the user 12 is increased when the pet 14 is in the pet pouch 16 by cinching the garment to the user 12. Additionally, cinching the garment to the user 12 makes the pet 14 feel more secure.

Figure 6:
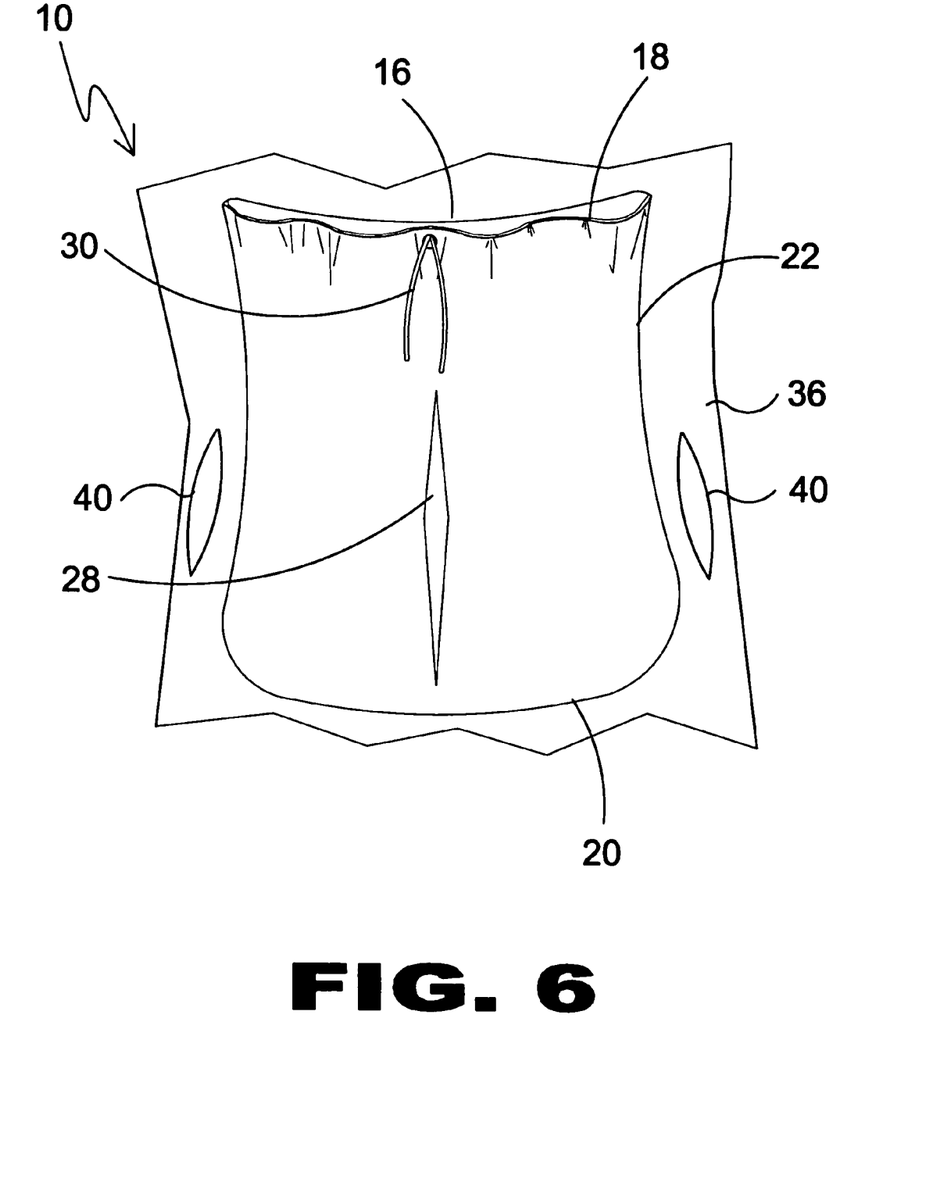
FIG. 6 is a perspective view of the pet pouch garment of the present invention.

FIG. 6 is a perspective view of the pet pouch garment 10 of the present invention. The pet pouch garment 10 includes the shirt 36 and the pet pouch 16 attached to the shirt 36 as described above with reference to FIG. 1. The garment can include a plurality of pockets 40, as shown herein. The pet pouch 16 can be made from the same material as the garment or can be made from a plurality of other materials. The pouch 16 shown herein includes the pleat 28 on the front thereof to allow the pouch 16 to expand when the pet 14 is located therein, and to lay flat when the pet 14 is not located therein. Shown herein, while the pouch top 18 includes the pouch drawstring 30 to close the top of the pouch 16 and retain the pet 14 therein, the drawstring is not cinched and the pet 14 would be permitted to peak out of the pouch top 18. Alternatively, a plurality of means exist to close the pouch top 18 including but not limited to a pouch drawstring 30, as shown herein, zippers, snaps, buttons, and hook and loop fasteners.

Figure 7:
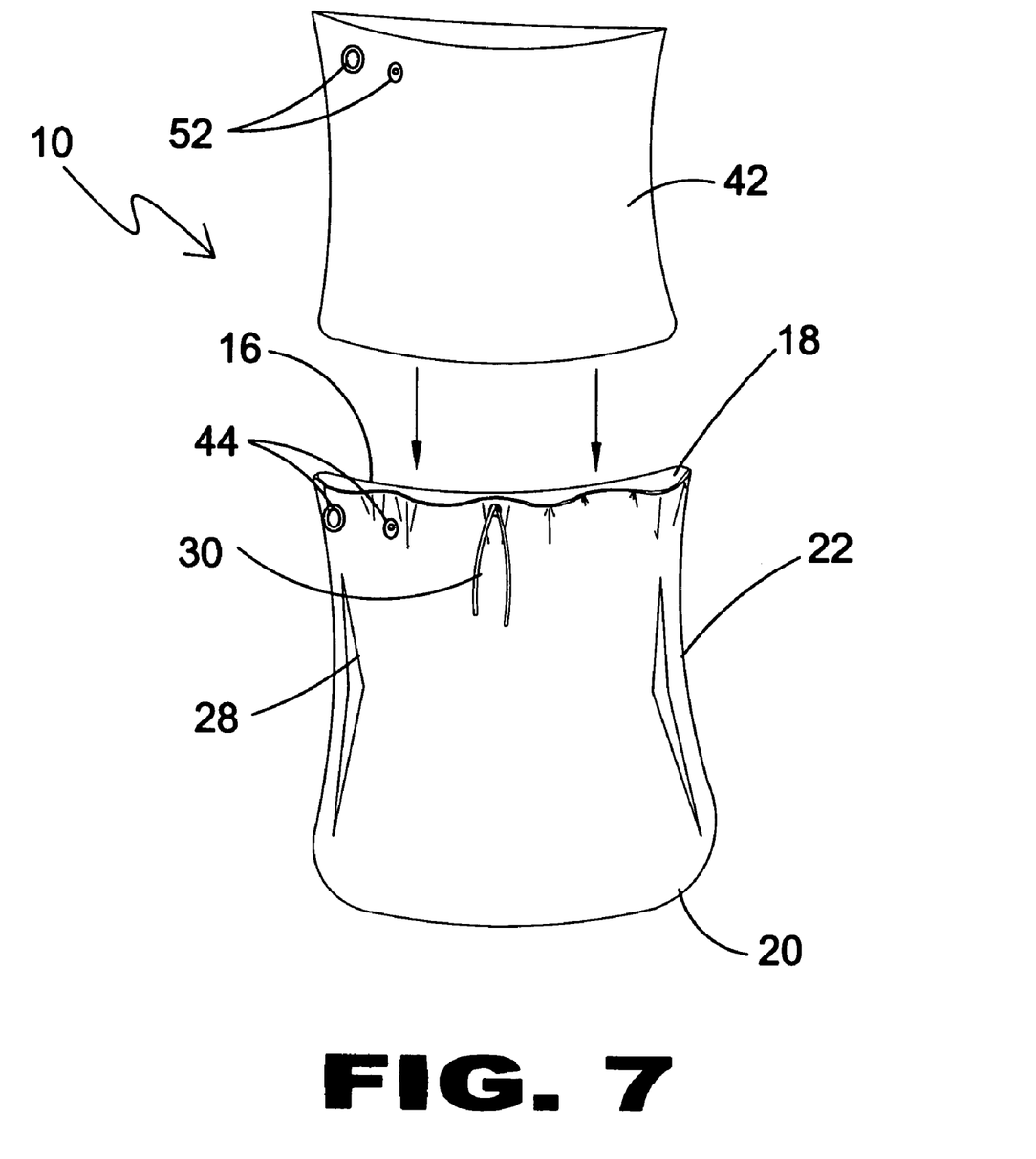
FIG. 7 is a perspective view of the pouch of the pet pouch garment of the present invention.

FIG. 7 is a perspective view of an alternate embodiment of the pouch 16 of the pet pouch garment 10 of the present invention. The pet pouch garment 10 includes the shirt 36 and the pet pouch 16 attached to the shirt 36 as described above with reference to FIG. 1. Shown herein, the pouch 16 includes two vertically extending pleats adjacent opposite sides of the pouch 16, for expansion when the pet 14 is located therein. The pleats 28 lay flat when the pet 14 is not located therein. Shown herein, while the pouch top 18 includes the pouch drawstring 30 to close the top of the pouch 16 and retain the pet 14 therein, the drawstring is not cinched and the pet 14 would be permitted to peak out of the pouch top 18. Alternatively, a plurality of means exist to close the pouch top 18 including but not limited to a pouch drawstring 30, as shown herein, zippers, snaps, buttons, and hook and loop fasteners.

The pet pouch garment 10 of the present invention also includes a pouch liner 42. The pouch liner 42 gets inserted into the pouch 16 and is attached therein by attaching means 52. A plurality of securing means includes but is not limited to zippers, snap members 44, buttons, and Hook and loop tape. The pouch liner is removable to permit ease of cleaning as well as to provide extra cushioning for the pet 14.

Figure 8:
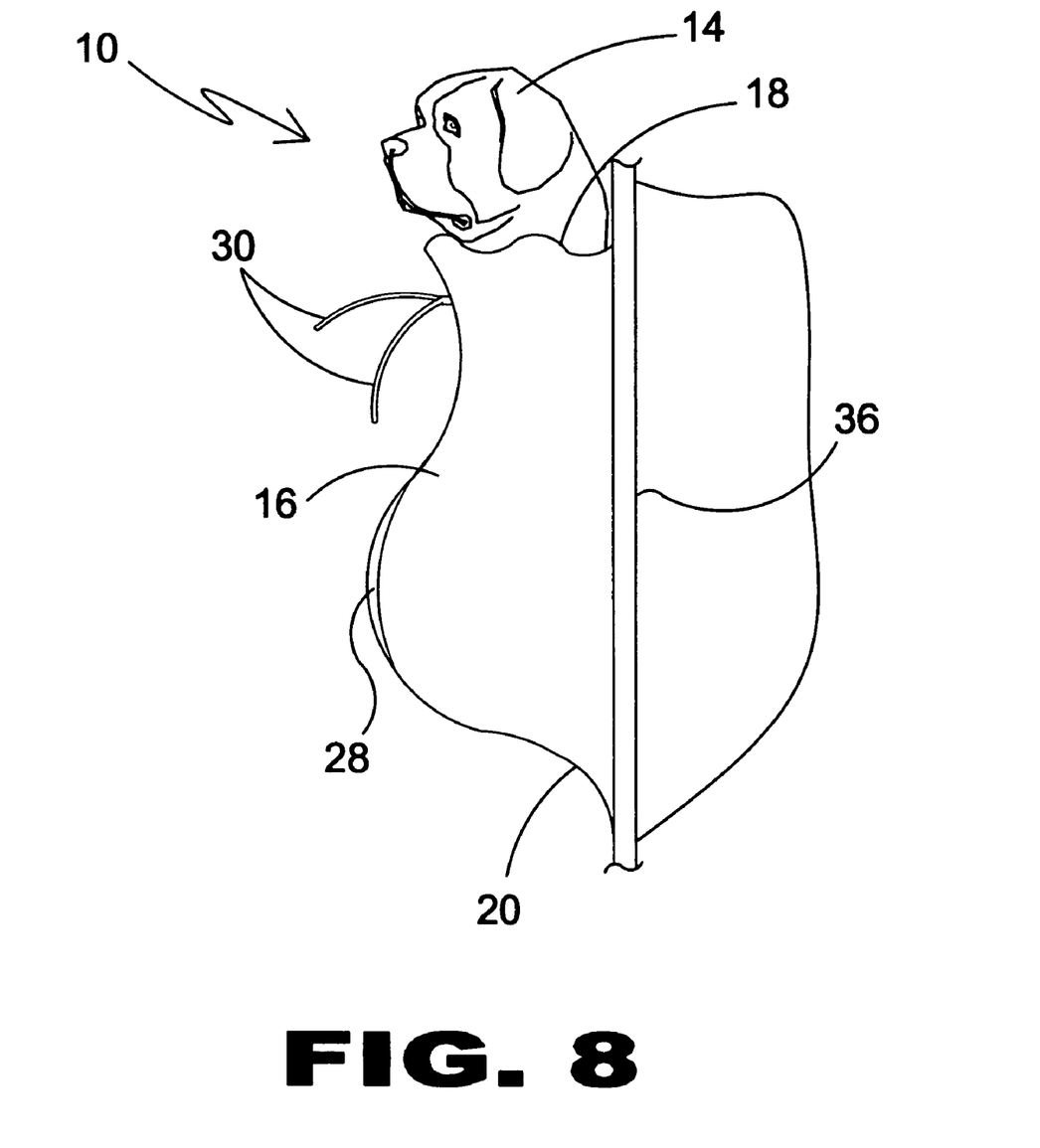
FIG. 8 is a perspective view of the side of the pet pouch garment of the present invention in use.

FIG. 8 is a perspective view of the side of the pet pouch garment 10 of the present claimed invention. The pet pouch garment 10 includes the shirt 36 and the pet pouch 16 attached to the shirt 36 as described above with reference to FIG. 1. The pouch 16 shown herein includes the pleat 28 on the front thereof to allow the pouch 16 to expand when the pet 14 is located therein, and to lay flat when the pet 14 is not located therein. Shown herein, while the pouch top 18 includes the pouch drawstring 30 to close the top of the pouch 16 and retain the pet 14 therein, the drawstring is not cinched and the pet 14 is permitted to peak out of the pouch top 18. Alternatively, a plurality of means exist to close the pouch top 18 including but not limited to a pouch drawstring 30, as shown herein, zippers, snaps, buttons, and hook and loop fasteners.

Figure 9:
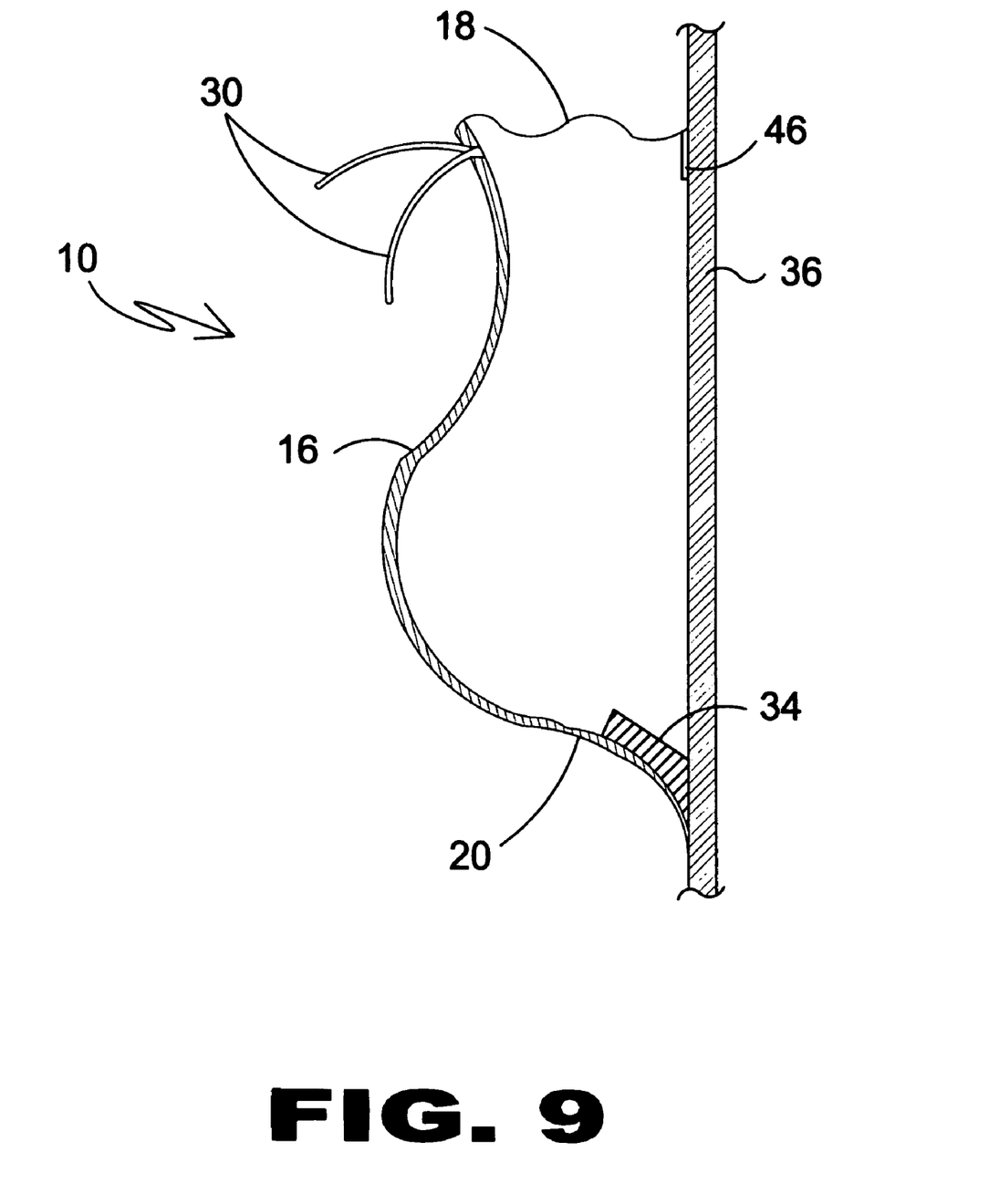
FIG. 9 is a perspective view of the side of the pet pouch garment of the present invention.

FIG. 9 is a perspective view of the side of the pet pouch garment 10 of the present claimed invention. The pet pouch garment 10 includes the shirt 36 and the pet pouch 16 attached to the shirt 36 as described above with reference to FIG. 1. Reinforcement 46 is included where the pouch top 18 and the pouch side 22 meet and are attached to the long sleeve shirt 36. To allow for more room for the pet 14, the pouch bottom 20 includes an expandable pouch base 34. Shown herein, while the pouch top 18 includes the pouch drawstring 30 to close the top of the pouch 16 and retain the pet 14 therein, the drawstring is not cinched and the pet 14 is permitted to peak out of the pouch top 18. Alternatively, a plurality of means exist to close the pouch top 18 including but not limited to a pouch drawstring 30, as shown herein, zippers, snaps, buttons, and Hook and loop tape.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An apparatus worn by a user for carrying a pet comprising:
- a. a shirt with sleeves worn on a torso of a user;
- b. a pouch having an open end attached on a first side of said shirt; wherein the pet is received through said open end and retained within said pouch;
- c. said pouch having a single vertically extending pleat centrally located in a front wall of said pouch for allowing expansion of said pouch;
- d. means for restraining said pet within said pouch comprising a first fastener selected from the group consisting of a drawstring, snaps, zippers, and hook and loop fasteners to fasten the first open end of the pouch; and
- e. a mesh window for pet viewing and ventilation, said mesh window being between said open end of said pouch and said pleat.

2. The apparatus as recited in claim 1, wherein the shirt is made of at least one of cotton fleece, sherpa, micro fleece, French terry, berber fabric, or any combination thereof.

\* \* \* \* \*